US011703572B2

(12) United States Patent
Stoppel

(10) Patent No.: US 11,703,572 B2
(45) Date of Patent: Jul. 18, 2023

(54) COMPONENT ASSEMBLY FOR A LIDAR SENSOR, AND LIDAR SENSOR

(71) Applicant: Robert Bosch GmbH, Stuttgart (DE)

(72) Inventor: Klaus Stoppel, Mundelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 708 days.

(21) Appl. No.: 16/716,778

(22) Filed: Dec. 17, 2019

(65) Prior Publication Data

US 2020/0200880 A1 Jun. 25, 2020

(30) Foreign Application Priority Data

Dec. 20, 2018 (DE) .......................... 102018222416.1

(51) Int. Cl.
*G01S 7/481* (2006.01)

(52) U.S. Cl.
CPC .......... *G01S 7/4818* (2013.01); *G01S 7/4814* (2013.01); *G01S 7/4816* (2013.01)

(58) Field of Classification Search
CPC .... G01S 7/4818; G01S 7/4814; G01S 7/4816; G01S 17/42; G01S 17/89; G01S 7/4817
See application file for complete search history.

(56) References Cited

U.S. PATENT DOCUMENTS

| 5,461,476 A * | 10/1995 | Fournier | G01N 21/474 385/115 |
| 7,692,125 B1 * | 4/2010 | Williams | F42B 15/01 333/248 |
| 7,933,055 B2 * | 4/2011 | Jensen | G01S 17/42 359/200.7 |
| 7,952,781 B2 * | 5/2011 | Weiss | H04N 3/08 359/201.1 |
| 2007/0076202 A1 * | 4/2007 | Cantin | A01M 7/0096 356/338 |
| 2017/0023679 A1 * | 1/2017 | Hays | G01S 7/4816 |
| 2017/0097407 A1 * | 4/2017 | Shpunt | G02B 26/105 |
| 2019/0154836 A1 * | 5/2019 | Campbell | H01L 27/14643 |
| 2020/0076152 A1 * | 3/2020 | Eichenholz | G01S 17/42 |

FOREIGN PATENT DOCUMENTS

| DE | 102007010236 A1 | 9/2008 |
| DE | 102008013906 A1 | 10/2009 |
| DE | 102017124633 A1 | 4/2019 |
| EP | 596865 A2 | 5/1994 |
| EP | 2645125 A1 | 10/2013 |

* cited by examiner

*Primary Examiner* — David P Porta
*Assistant Examiner* — Mamadou Faye
(74) *Attorney, Agent, or Firm* — Norton Rose Fulbright US LLP; Gerard Messina

(57) ABSTRACT

A component assembly for a LIDAR sensor including a stator; a rotor; a detector system having at least one first detector; and a first optical waveguide including an input and an output and light-conducting fibers, the first optical waveguide being situated inside the rotor and disposed so as to be able to rotate along with the rotor, and the first optical waveguide is developed to receive a first light beam coming from a surrounding area via the input at the light-conducting fibers and to guide them via the light-conducting fibers out of the output in the direction of the first detector.

19 Claims, 8 Drawing Sheets

COMPONENT ASSEMBLY FOR A LIDAR SENSOR, AND LIDAR SENSOR

CROSS REFERENCE

The present application claims the benefit under 35 U.S.C. § 119 of German Patent No. DE 102018222416.1 filed on Dec. 20, 2018, which is expressly incorporated herein by reference in its entirety.

FIELD

The present invention relates to a component assembly for a LIDAR sensor and to a LIDAR sensor.

BACKGROUND INFORMATION

In the current related art, conventional LIDAR systems essentially are distinguished by the illumination methodology. For one, scanning systems are available which—from the aspect of time—illuminate only a small portion of the surrounding area, and flash systems, which completely illuminate the surrounding area within an instant.

In a scanning LIDAR system, the field of view (FOV) is sequentially illuminated over time with the aid of a spot laser beam or a laser line. In the case of a flash system, the complete field of view is illuminated by a laser flash and the reflected light is received in a two-dimensional detector array. Low frequencies (e.g., 10 Hz to 100 Hz) are normally used for such a purpose. These flash systems achieve an adequate image resolution only if a two-dimensional detector array featuring a large number of pixels is used as a receiver unit.

The size of the detector array corresponds to approximately 60% to 80% of the size of the receiver lens, which makes it possible to achieve a sufficient angle detection. A receiver lens aperture of >25 mm is required in order to realize a large detection range with the aid of LIDAR systems and to comply with limit values for eye safety at the same time. The detector surface, which is situated behind a 25 mm optics, has a corresponding size of 20×20 mm$^2$. Such large photodetectors are very cost-intensive in their production and are currently available only in small batch numbers. The required bandwidth that the detector must have lies in the single-digit nanosecond range so that a sufficient distance resolution (i.e. a distance resolution of <0.5 m) is able to be realized.

Scanning LIDAR systems (which are known as macro scanners) frequently use a rotating element (also known as a rotor), which, for instance, emits a vertical laser line into the surrounding area. A one-dimensional detector array (e.g., a line detector) is then used to receive the laser line. A line detector is more cost-effective than a two-dimensional detector. However, a line-flash scanner also requires a complex receiver which is able to realize an adequate resolution. The resolution in the vertical is realizable based on the pixel number on a detector. With the aid of the high-resolution receiver optics, the reflecting objects in the field of view are imaged to the individual pixels.

Individual semiconductor lasers or semiconductor laser arrays are used to obtain a vertical image resolution in the range of 0.15° to 0.5° with the aid of a macro scanner. The semiconductor lasers are vertically placed in a row, and the number of used semiconductor lasers results in the number of pixel points. At the present time, a laser pulse of a single laser is able to generate a maximum pulse output of 80 W to 120 W with pulse lengths of 2 ns to 50 ns. One hundred transmitting beams having a field angle of 0.15° in each case are generated in order to address a field of view of 15° in the vertical with a resolution of 0.15°. In other words, this means that a total of one hundred lasers emitting the laser light in a sequential manner has to be used.

Conventional micro scanners generally include a MEMS mirror (i.e., a micro mirror). A MEMS mirror is restricted in its deflection to a mechanical tilting angle of approximately 25°. This results in a maximum optical deflection of the transmitting beam of approximately +/−50°. The speed of a MEMS mirror depends on its size. A mirror surface of approximately 3-6=$^2$, for example, allows for a maximum frequency of <30 kHz in the resonant operation.

Two-dimensional micro scanners having MEMS mirrors are able to deflect only small laser beam diameters on account of the relatively small mirror surface of the MEMS mirrors. For small laser beam diameters, the eye safety limit value for the laser output is considerably lower than for large laser beam diameters. It is more difficult to emit a higher transmit power using a small laser beam diameter in an effort to achieve ranges of >100 m. The high power density of the laser beam thus restricts this system for high ranges. Another disadvantage of a micro scanner is the large and cost-intensive detector. The size of the detector is the same as a detector size for use in a flash LIDAR system.

A combination of micro and macro scanners allows for an increase in the transmit power by at least a factor of two. At the same time, the use of a one-dimensional detector is possible.

SUMMARY

According to a first aspect, the present invention relates to a component assembly for a LIDAR sensor. A 'LIDAR sensor' describes a sensor as it is known to one skilled in the art and/or a LIDAR sensor as described above, which has a laser source, a transmitter unit and a detector system. In this context, a 'component assembly' refers to a technically cohesive totality of individual LIDAR components such as a stator and/or a rotor and/or a laser and/or an optical waveguide and/or a detector system within the LIDAR sensor. The component assembly according to the present invention includes a stator which may have a laser source. In addition, the component assembly according to the present invention includes a rotor as well as a detector system having at least one first detector. In addition, it may also be the case that a plurality of detectors is provided within the detector system. The component assembly according to the present invention also includes a first optical waveguide, which has an input that particularly is developed to receive radiation that has been reflected and/or backscattered by an object, and the first optical waveguide has an output, which particularly is developed to guide a first light beam onto the first detector, as well as at least two light-conducting fibers. In this context, 'light-conducting fibers" are understood to be glass fibers and/or plastic fibers, for example, as long as these light-conducting fibers are essentially suitable to couple a first light beam, e.g., a laser beam, to forward it in accordance with its propagation and to decouple it again. The first optical waveguide is situated within the rotor such that it is able to rotate along with the rotor. The first optical waveguide may thus be connected to the rotor via a suitable fastening means as long as the first optical waveguide is able to rotate along with the rotor. Light-conducting fibers according to the present invention, for example, may have a lateral surface, which is also known as a 'cladding surface', whose thickness may vary between 0.5 μm and 4 μm.

However, it is mainly the fiber core of the light-conducting fibers that is meant when 'light-conducting fibers' are mentioned in the following text. The term 'light beam' may be understood according to the beam model of light as a simplified description of a totality of electromagnetic waves as they are bundled in a laser, for example, and are relevant for the examined system. A received first light beam, for instance, is able to be coupled into the light-conducting fibers at the input of the first optical waveguide with the aid of a coupling optics, e.g., a lens. After the light beam has passed through the light-conducting fibers of the first optical waveguide, the first light beam may arrive at the output and be guided onto the first detector. For instance, to conduct the first light beam, which especially is a laser beam, onto the detector in accordance with the propagation direction of the light beam, a focusing optics such as in the form of a lens may be situated at the output of the optical waveguide. In addition, a collimation optics to which a filter is connected downstream, the filter in turn having a focusing optics connected downstream, may be connected downstream from the optical waveguide output from which the light beam emerges or is decoupled from the light-conducting fibers. For instance, the detector may be connected downstream from the focusing optics in relation to a propagation direction of the first light beam. The optical waveguide according to the present invention offers the particular advantage that a light beam is able to be rearranged by being coupled into the light-conducting fibers and subsequently being decoupled onto a detector or onto individual smaller detectors, in particular photodetectors. Moreover, especially when the light-conducting fibers at the output are bundled, the surface of a receiving-side filter is able to be reduced because there is no need to position the filter directly upstream or downstream from a large receiver optics such as a lens. With the aid of the component assembly according to the present invention it is advantageously also possible to detect the received first light beam, e.g., a laser beam, within the rotor with a minimal space requirement and low demands on the accuracy. In addition, using the first optical waveguide, which is situated in the component assembly of the first LIDAR sensor, the number of selected laser sources and detectors for the vertical field of view is scalable within a large angular range, e.g., 6° to 60°. With the aid of the component assembly according to the present invention, this allows for the development of different sensors having visual ranges of different sizes or image resolutions of different magnitudes. In addition, the component assembly according to the present invention is a small and compact unit on account of the used optical waveguide, which is essentially made up of light-conducting fibers and thereby makes the corresponding production less complex. The receiving-side optical waveguide system also does not require a detector having many pixels because the image resolution in the vertical field of view is able to be realized by a time synchronization of laser shots with the aid of a mirror position, e.g., within a macro scanner and/or a micro scanner. More specifically, starting with a predefined number of light-conducting fibers, especially five light-conducting fibers, input-side splitting of the fiber ends is able to take place in the optical waveguide according to the present invention, in which case the fiber ends may be arranged in a line, in particular. On the output side, on the other hand, bundling of the fibers may be present, the fibers surrounding a central fiber end in a hexagonal manner, for instance, and being arranged in the form of a two-dimensional, tightest cylindrical package. Due to the resulting compacting of the laser light to a round cross-section, such a system of light-conducting fiber ends at the output also makes it possible to realize a reduction of the detector surface within the LIDAR system, especially in the case of a LIDAR system featuring a line illumination. More specifically, with such a system of output-side light-conducting fiber ends, the laser light on the output side is able to be emitted in a divergent manner under a relatively large radiation angle and be collimated with the aid of a lens optics. This makes it possible to integrate a band-pass filter having a very small bandwidth between a collimation lens and a focusing optics. Since the received light beam is able to be guided through a filter with only a slight angular offset, the filter bandwidth may be reduced. A narrower filter improves the disturbance light suppression and the range of the sensor becomes greater. In addition, the surface of the filter is smaller in comparison with a filter that is installed directly downstream from a receiver optics, e.g., a lens. This saves additional costs in the production of a sensor.

Preferred further developments of the present invention are described herein.

According to an advantageous further development, the component assembly according to the present invention includes a second optical waveguide, which has similar features and advantages as the first optical waveguide described earlier. The second optical waveguide is developed to guide a second light beam, received from the surrounding area, onto a second detector, which is spatially separated from the first detector. In addition, the second optical waveguide is situated within the rotor and, like the first optical waveguide, disposed so as to be able to rotate along with the rotor. Like the first optical waveguide, the second optical waveguide may feature input-side splitting of the light-conducting fibers and also an output-side bundling of the fiber ends. In addition to the second optical waveguide, a third, fourth and/or fifth etc. optical waveguide may be provided as well, which may have similar properties and features as well as advantages as the first optical waveguide according to the present invention. The first optical waveguide may have a line-type extension, in particular. Moreover, the second optical waveguide may be situated parallel to this line-type extension of the first optical waveguide. The respective first and second detectors of the detector system according to the present invention may be situated at the outputs of the first and second optical waveguides in each case.

According to another advantageous further development of the component assembly according to the present invention, the first and second optical waveguides may have a common input as well as outputs that are spatially separated from each other. More specifically, the common input may have a rectangular form within which the light-conducting fibers are fanned out. This rectangular form of the input of the first optical waveguide is able to be connected to the rectangular form of the input of the second optical waveguide in order to correspondingly enlarge the input-side detection surface. The outputs are separated from one another, in particular. More specifically, the outputs may bundled, the outputs including a cable which especially has a cylindrical cross-section in which the light-conducting fibers are positioned with the tightest packaging. This makes it possible to create a large input-side detection surface due to the lateral spreading, while the received light beams are able to be guided onto different detectors of the detector system in order to obtain the afore-described advantages.

According to one advantageous further development of the component assembly according to the present invention, a number of light-conducting fibers of the first and/or second optical waveguide(s) amounts to 5 to 1000. The number may preferably also amount to 30 to 800 and especially preferred, to 50 to 500. In these cases, there are no gaps in the line if individual fibers malfunction because the light-conducting fibers mix the light beams of all reflected and received light beams in the vertical direction and thereby produce a radiation angle of 25° to 80°, for example. With the aid of the adapted receiver optics of the present invention, a receiving angle of 12° to 25° is able to be realized. A larger number of fibers such as 50 to 500 fibers provides sufficient redundancy, for instance when individual fibers malfunction. For the connection between received light beams from the surrounding area and the detector of the component assembly of the LIDAR sensor, the fibers are angled, in particular. The angle, for example, amounts to 80° to 120°, in particular to 90°. For instance, the light-conducting fibers within the optical waveguide are bundled in order to produce the tightest package possible. This means that the light-conducting fibers are compressed in a cylindrical and/or in a rectangular form, for instance. A cross-section resulting from such a form is particularly also provided for the output. This cross-section may especially extend across 70% of the first and/or second optical waveguide(s) before a widening is able to be implemented with respect to the input for the receiving of the light-conducting fibers. Additionally or alternatively, a diameter of the light-conducting fibers of the first and/or second optical waveguide(s) amounts to 10 to 150 μm. With a smaller diameter, the coupling efficiency may be too low, and a larger diameter than the predefined range may cause the compactness of the design to be lost. Additional diameters possible for the component assembly according to the present invention, for instance, are, 10 μm to 80 μm, preferably 30 μm to 70 μm and/or 100 μm to 150 μm, and particularly preferred 120 μm to 140 μm. With the aid of an optical waveguide according to the present invention, a received light beam is particularly able to be guided in the afore-described and also in a compressed manner to a detector. This makes it possible to space the detectors of the detector system apart from a laser driver, which may be provided in a component assembly according to the present invention. This reduces electrical crosstalk of the detector electronics with a low construction outlay since a detector is able to be placed at a greater distance from a laser driver than is the case in known LIDAR sensors.

According to one further advantageous development of the present invention, a laser source may be positioned on the stator and/or the rotor. A component assembly according to the present invention, which allows for any type of detector placement due to the first optical waveguide, is able to be used in a variable manner for different LIDAR systems.

According to one advantageous further development of the component assembly according to the present invention, a rotor may include a transmitter unit provided with a micro mirror and/or a polygon mirror. Moreover, a light source may be placed outside the rotor, in particular on the stator, while the light source is able to guide light beams onto the micro mirror and/or the polygon mirror via a deflection mirror that is situated on the stator, in particular. A vertical resolution with regard to a field of view is thereby able to be produced in an uncomplicated manner through the simple use of a deflection mirror. When a micro mirror is combined with a macroscopic transmitter optics, a diameter of the transmitting beam is able to be enlarged. Because of the enlarged transmitting beam diameter, more laser output is able to be emitted at the output of the LIDAR system without exceeding a limit value for eye safety.

According to an advantageous further development of the component assembly according to the present invention, the input of the first optical waveguide has a rectangular form with an edge length of 2 to 25 mm, the input in particular representing a cross-sectional surface of the light-conducting fibers perpendicular to the incidence direction of the light, or an end face of the first optical waveguide, e.g., in a linear arrangement of the light-receiving ends of the light-conducting fibers, onto which the wave front of the light beam impinges. In a particularly preferred manner, the edge length amounts to 5 to 10 mm. For example, lateral spreading of the light-conducting fibers may be implemented at the output. The light-conducting fibers particularly extend across the full length of the first and/or the second optical waveguide(s). More specifically, the light-conducting fibers at the input may be situated in a line with mutual contact in the form of a "chain". Put another way, this particularly refers to the placement of the circular ends of the light-conducting fibers. Each light-conducting fiber at the output may be in direct contact with its neighbor. As an alternative, the light-conducting fibers are situated in isolated groups of two in a line, and thus are not in contact with their group-of-two neighbor. For example, the light-conducting fibers are able to be connected to a fiber substrate, which is made of glass, for instance, at the input. The light-conducting fibers used therein are glass fibers, for example, which particularly have a softening point $T_g$ that ranges from 400° C. to 500° C. The fiber substrate, for instance, has a higher $T_g$ than previously described (e.g., 500° C., so that no deformation of the substrate occurs). A positive engagement between the substrate material and the light-conducting material may come about. Thus, no bonding agent, for instance, has to be used for the assembly in such a case. Furthermore, the previously mentioned features may additionally or alternatively apply to the second as well as further optical waveguides.

According to one advantageous further development, the first optical waveguide is configured to deflect the first light beam at least once. For example, this is advantageous in particular if the detector is situated at a right angle to the receiving direction of the first optical waveguide. The first optical waveguide may generally have a curvature of 80° to 120° in order to guide the light into the detector and thereby reroute light in the required direction. The first optical waveguide preferably has a curvature of 90° for this purpose. If the first optical waveguide has a curvature, then the light-conducting fibers guided therein naturally have a curvature as well. Such a curvature may be used to guide the light coupled into the first and/or the second optical waveguide(s) to a corresponding position, e.g., the detector of the detector system. In the case of the first optical waveguide, for instance, this means routing the light beam from the surrounding area of the LIDAR sensor to the detector. The first and/or the second optical waveguide(s) may preferably have more than one, and in particular two curvatures, the light beam being able to be deflected twice for this purpose. This also makes it possible to save design space in the production of the sensor.

Because of the advantageous further development of the present invention mentioned in the previous paragraph, the first detector is able to be placed outside the rotor. Since the first detector of the detector system may be positioned outside the rotor, the cooling and temperature control of light sources of the LIDAR system and the detector can be substantially simplified. In particular, it is furthermore also possible to realize a transmitter optics of a LIDAR sensor within the component assembly according to the present invention with the aid of an optical waveguide. In this case, light beams are coupled into an input having a circular cross-section via a coupling optics into the optical waveguide and emitted with the aid of a lens optics into a surrounding area or emitted with respect to a light field sensor. In this way the design of an optical waveguide according to the present invention makes it possible to position a laser and/or a detector of the detector device outside the rotor, e.g., on the stator. The complex transmission of current and data for a receiver and/or transmitter on the movable part of the sensor is therefore no longer necessary. This reduces the costs and the complexity of the LIDAR sensor. In addition, the temperature control of the respective components is able to be improved. The temperature control of a rotating part of conventional macro scanners is normally a central problem. The rotating part of the LIDAR system can mostly be cooled only by the air that is circulating in the device, which considerably restricts the heat dissipation. The limited heat dissipation restricts the performance as it greatly depends on the number of laser shots and the laser power. The increase in efficiency is achieved through an easy temperature control as a result of the improved heat dissipation to the stator. Additionally or alternatively, spatially separated inputs of optical waveguides, whose light-conducting fibers are bundled in a common output, may be provided. Such a system may be denoted as an initial system. A complementary system, which is identical with the initial system, especially in terms of its structure, may be connected downstream from the output of the initial system; the light-conducting fibers of the complementary system have a common input, which corresponds to the structure of the output of the initial system. In addition, the outputs of the complementary system correspond to the inputs of the initial system in terms of their structure. This makes it possible to use the light-conducting fibers according to the present invention to guide light beams that transition from the initial system to the complementary system to a stator-side detector system having more than one detector.

According to one advantageous further embodiment, a filter may be situated between the first detector and the output of the first optical waveguide. The filter is especially used for optimizing the steepness of the rising edges that define the time between the starting and the receiving instants of the light. The filter may include a balanced detector, for instance. The use of a balanced detector makes it possible to improve the dynamic response of the detector of the detection unit, in particular.

According to a second aspect, the present invention relates to a LIDAR sensor which includes the component assembly according to the first invention aspect. Such a LIDAR sensor, for example, may be a flash-operated LIDAR sensor and/or a micro-scanning LIDAR sensor and/or a macro-scanning LIDAR sensor.

BRIEF DESCRIPTION OF THE DRAWINGS

In the following text, exemplary embodiments of the present invention are described in detail with reference to the figures.

DETAILED DESCRIPTION OF EXAMPLE EMBODIMENTS

Figure 1:
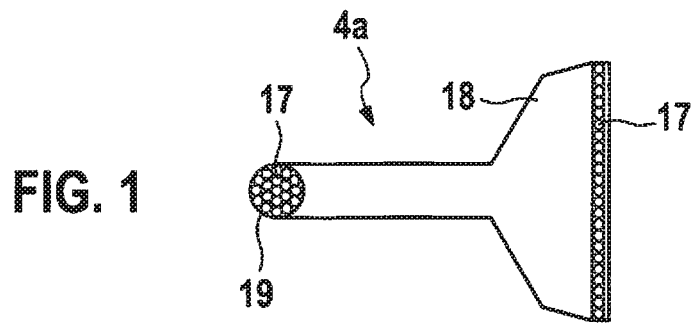
FIG. 1 shows an exemplary embodiment of a first optical waveguide according to the present invention.

FIG. 1 shows a first exemplary embodiment of a first optical waveguide 4 according to the present invention. Here, output 19 is shown, and light-conducting fibers 17 are situated within output 19 with the tightest packaging. In particular, the cross-section of the output is constant up to a widened section of light-conducting fibers 17. At input 18, which may be developed as a fiber line, for example, of the exemplary embodiment of first optical waveguide 4, light-conducting fibers 17, which are bundled at output 19, are fanned out and arranged in a line (fiber line) in order to receive a first light beam 7a. Adjacent light-conducting fibers 17 touch one another and form a chain. In other words, light-conducting fibers 17 are fanned out at input 18 whereas light-conducting fibers 17 are bundled along a path leading up to output 19.

Figure 2:
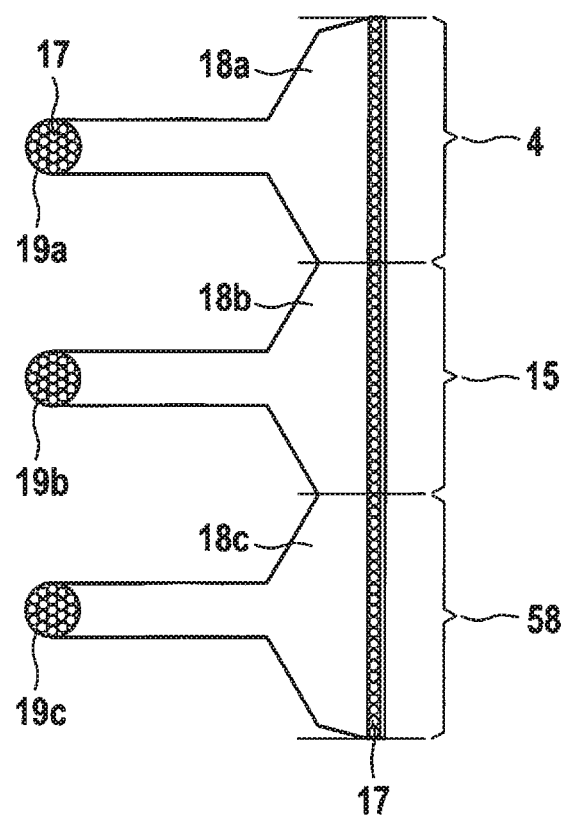
FIG. 2 shows an exemplary embodiment of three optical waveguides according to the present invention, which have a common input.

FIG. 2 shows an exemplary embodiment of three optical waveguides 4a to 4c according to the present invention. Inputs 18a to 18c of the first to third optical waveguides 4, 15, 58 are connected to one another, and light-conducting fibers 17 form a common, uninterrupted line on account of the inputs 18a to 18c, which are connected to one another. Downstream from inputs 18a to 18c, the combined fiber bundles of light fibers 17 of respective optical waveguides 4, 15, 58 extend in parallel to one another and terminate in spatially separate outputs 19a to 19c.

Figure 3:
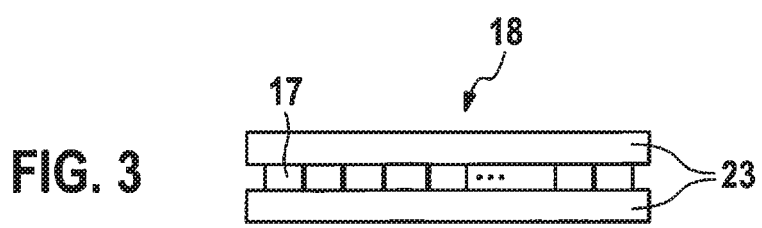
FIG. 3 shows an exemplary embodiment of an output of an optical waveguide according to the present invention.

FIG. 3 shows an exemplary embodiment of an input 18 according to the present invention. In this instance, light-conducting fibers 17 are situated between two fiber substrates 23.

Figure 4:
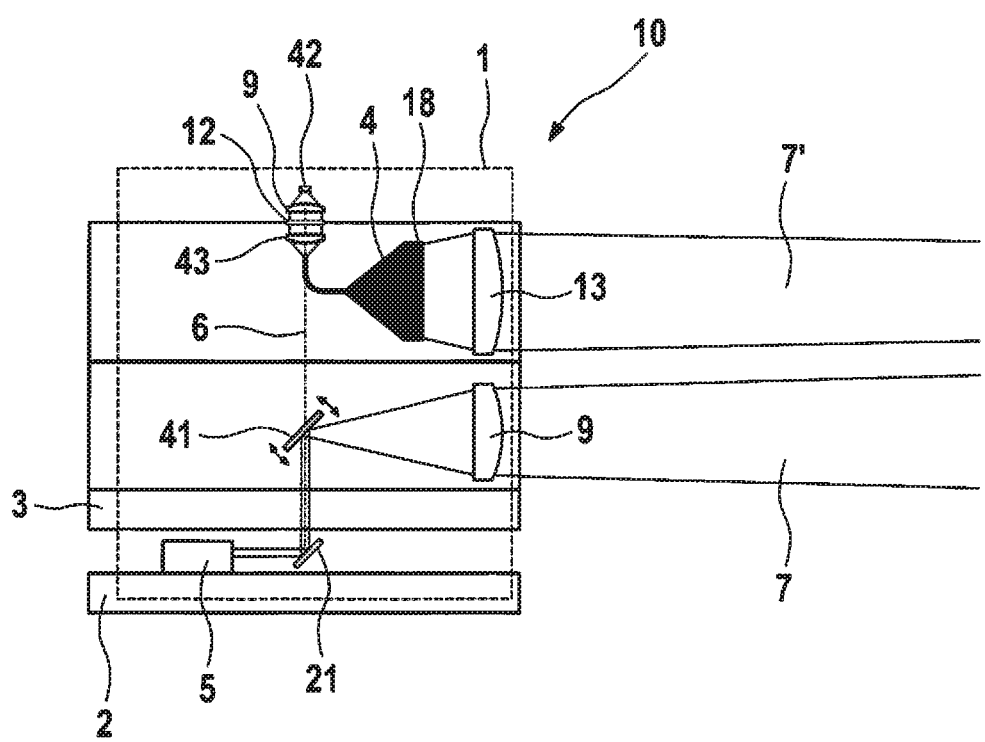
FIG. 4 shows a first exemplary embodiment of a LIDAR sensor according to the present invention.

FIG. 4 shows an exemplary embodiment of a first LIDAR sensor 10. First LIDAR sensor 10 includes a component assembly 1 according to the present invention. Component assembly 1 according to the present invention includes a stator 2 as well as a rotor 3. In addition, component assembly 1 according to the present invention includes a transmission path, which includes a laser source 5 whose outgoing light beam 7 is initially guided via a deflection mirror 21 onto a micro mirror 41, which is able to move about an axis of rotation 6 of LIDAR sensor 10. From micro mirror 41, the light beam reaches a focusing optics 9, whereupon light beam 7 is emitted via focusing optics 9 to an object, which is not shown here. From this object, the light beam is able to be reflected and received on a receiving optics 13 of a transmission path shown inside the component assembly according to the present invention above the black line. Downstream from receiver optics 13, the light beam impinges upon input 18 of first optical waveguide 4 according to the present invention. From there, reflected light beam 7 is projected via optical waveguide 4 onto a collimation optics 43 from where light beam 7 reaches a filter 12 and after having passed through it, it reaches a focusing optics 9. After passing through focusing optics 9, the light beam reaches first detector 42, which is situated outside of stator 2. Because of the curvature of first optical waveguide 4—the curvature amounting to 90°—, the light beam is guided onto the collimation optics once it has left first optical waveguide 4.

Figure 5:
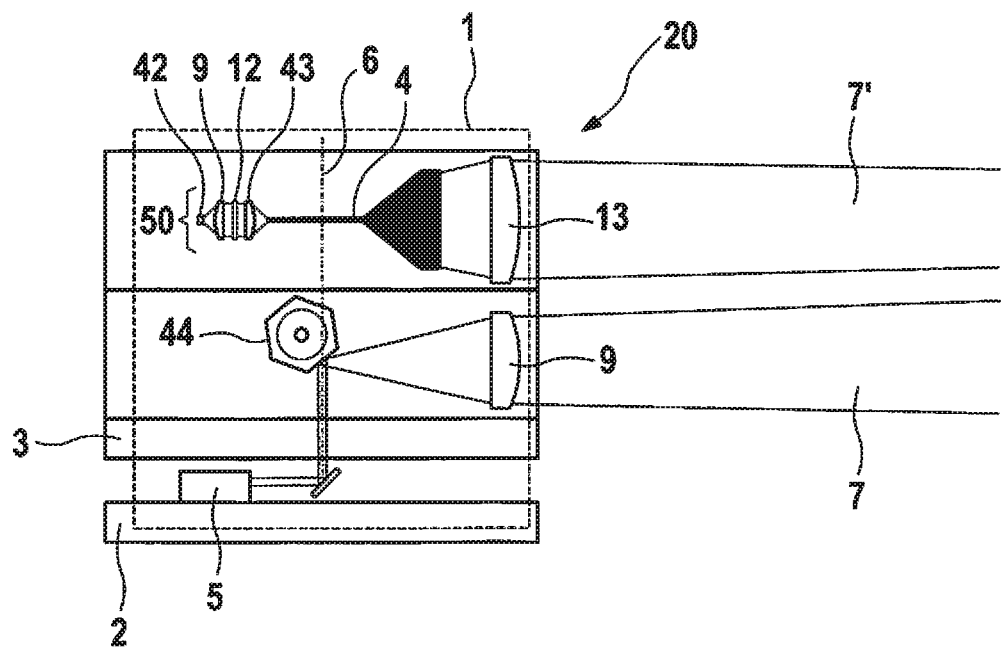
FIG. 5 shows a second exemplary embodiment of a LIDAR sensor according to the present invention.

FIG. 5 shows an exemplary embodiment of a second LIDAR sensor 20 having a component assembly 1 according to the present invention. Second LIDAR sensor 20 differs from first LIDAR sensor 10 in that it has a rotating polygon mirror 44 instead of a micro mirror 41; rotating polygon mirror 44 is developed to emit a light beam 7 in a vertical direction with respect to a field of view.

Figure 6:
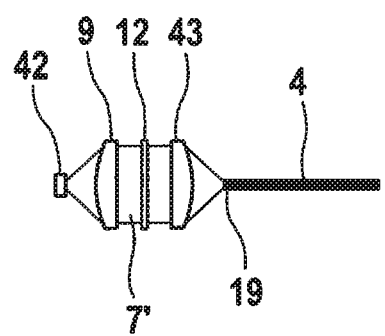
FIG. 6 shows an optics system connected downstream from the optical waveguide according to the present invention.

FIG. 6 shows an enlarged representation of an optics system which is connected downstream from first optical waveguide 4 and situated between first optical waveguide 4 and detector 42. Light beam 7, which leaves first optical waveguide 4 at output 19, passes through a collimation lens 43 and is guided across a filter 12 in collimated form, light beam 7 then passing through a focusing optics 9 so that light beam 7 is guided onto first detector 42. First detector 42 is situated within the focal length of the focusing optics, in particular.

Figure 7:
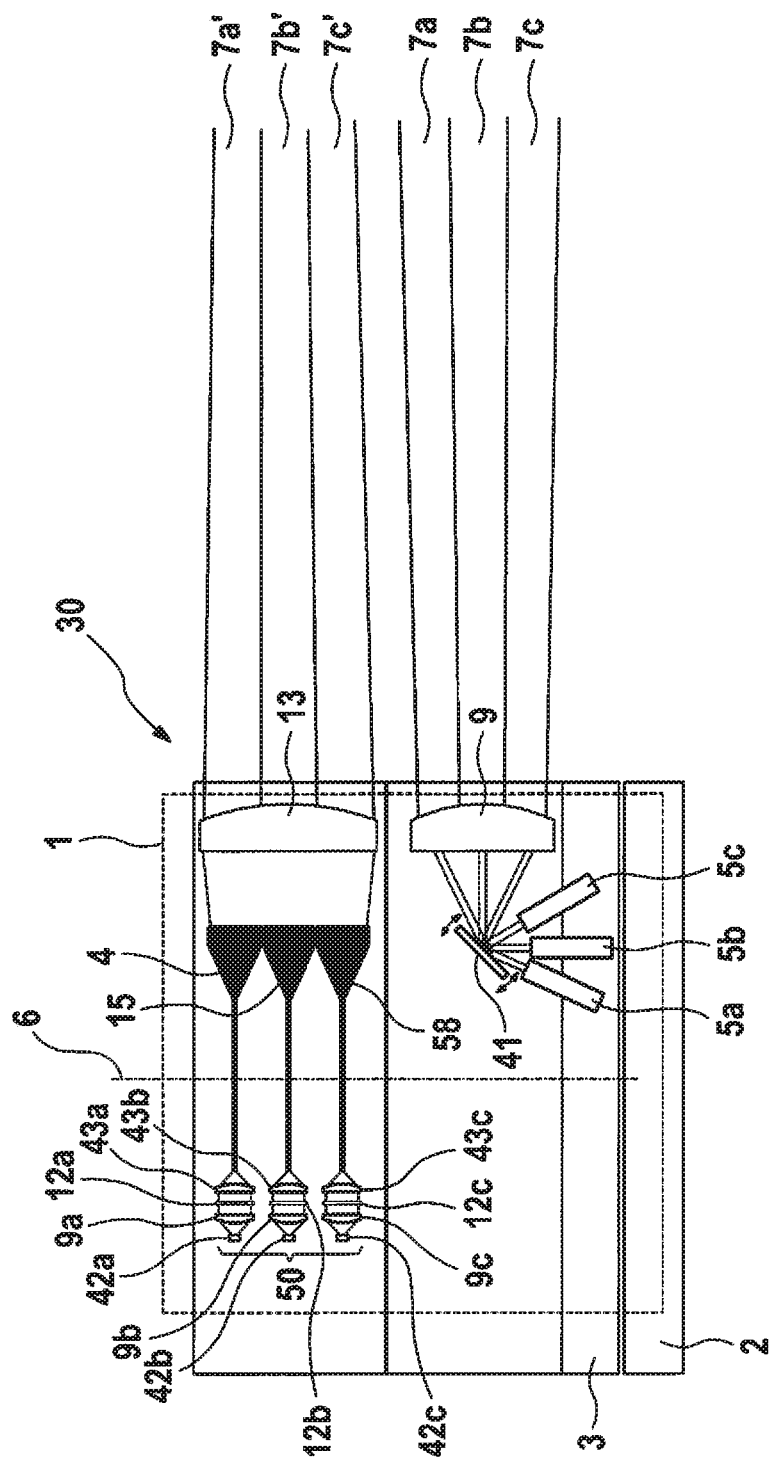
FIG. 7 shows a third exemplary embodiment of a LIDAR sensor according to the present invention.

FIG. 7 shows an exemplary embodiment of a third LIDAR sensor 30. Third LIDAR sensor 30 has a component assembly 1 according to the present invention, which differs from component assembly 1 from FIG. 6 in that three laser sources 5a to 5c are situated in the rotor, which are developed to emit three light beams 7a to 7c into a field of view. Reflected corresponding light beams 7a to 7c are received on the detector side via a first to third optical waveguide 4, 15, 58. The first to third optical waveguides are situated parallel to one another and have a common input. In addition, reflected light beams 7a to 7c are guided to the first to third detectors by way of the optical system described in FIG. 6.

Figure 8:
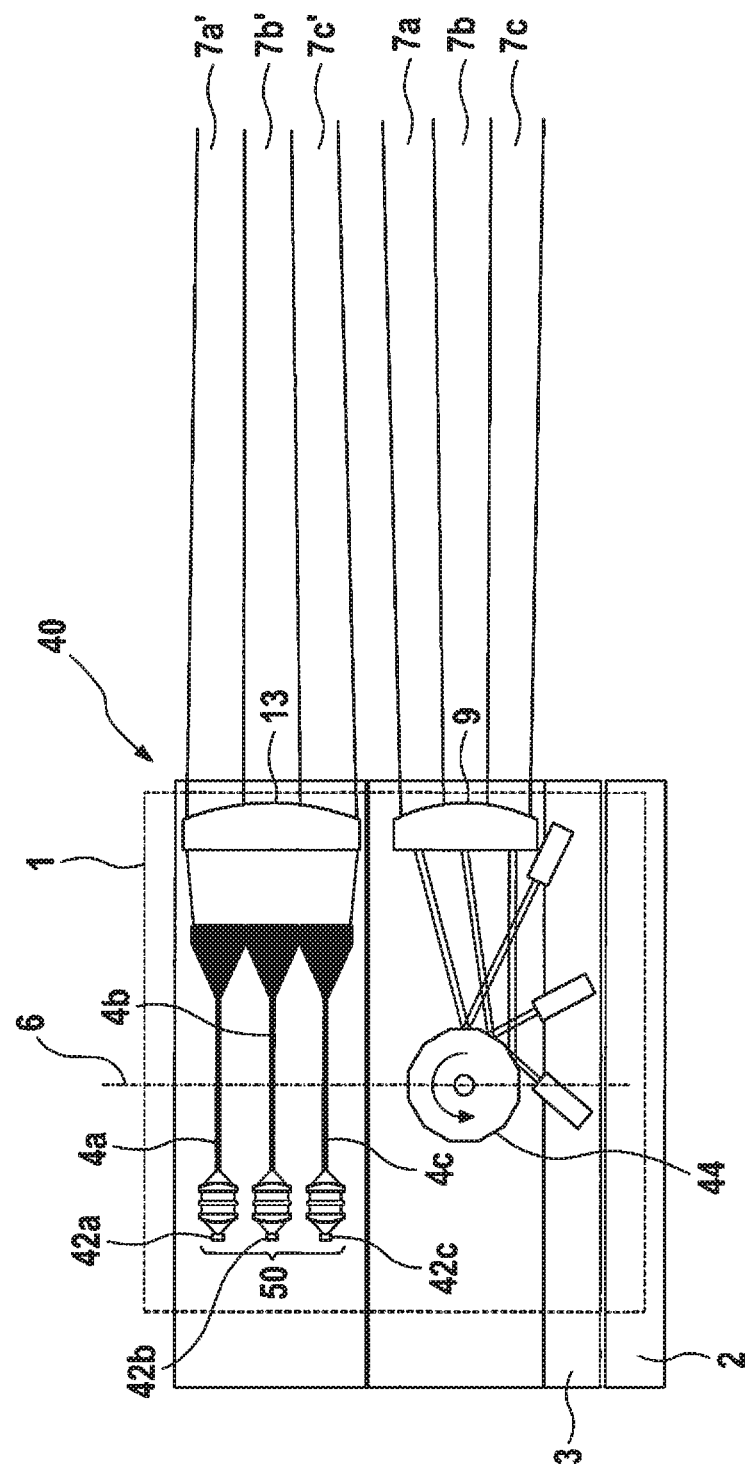
FIG. 8 shows a fourth exemplary embodiment of a LIDAR sensor according to the present invention.

FIG. 8 shows an exemplary embodiment of a fourth LIDAR sensor 40 of the present invention. Fourth LIDAR sensor 40 differs from third LIDAR sensor 30 from FIG. 7 in that component assembly 1 according to the present invention has a polygon mirror 44 for the vertical scanning of a field of view.

Figure 9:
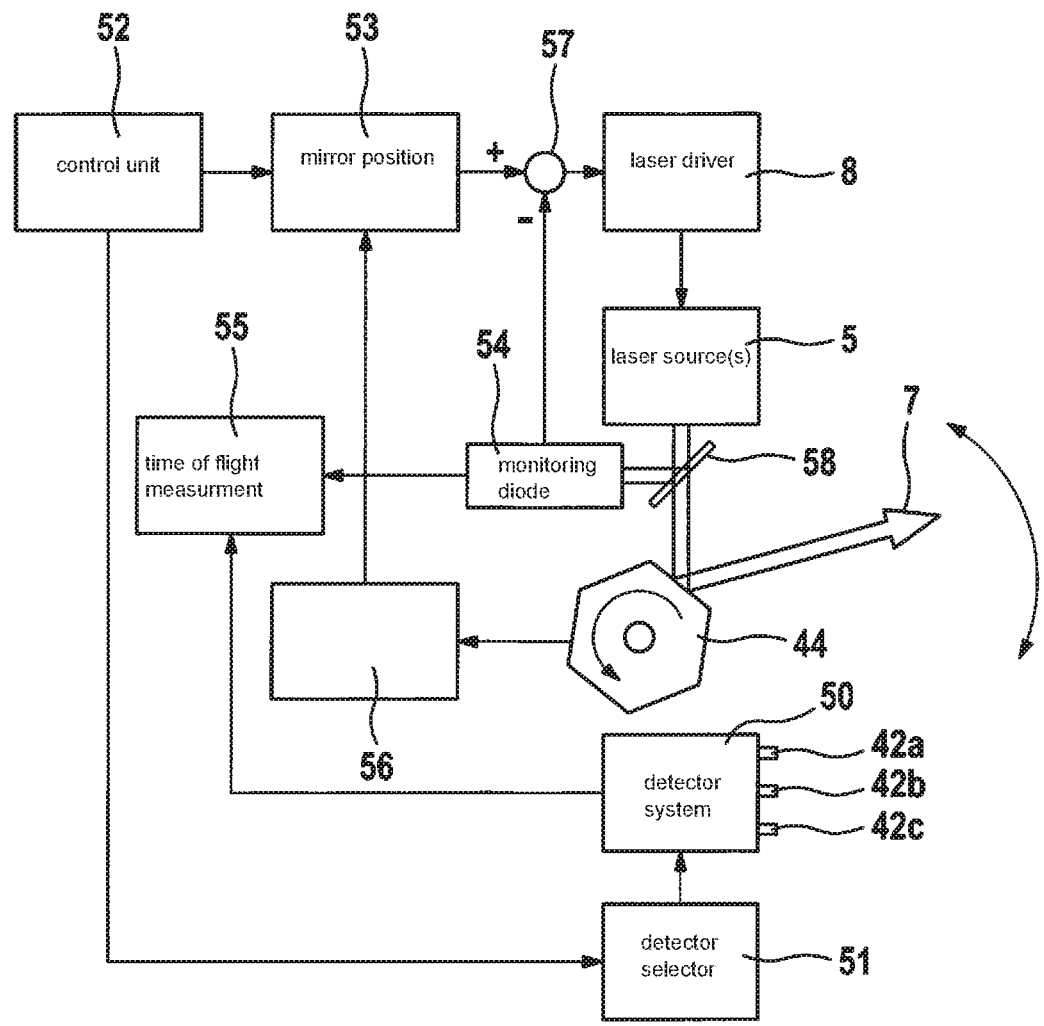
FIG. 9 shows an exemplary embodiment of a block diagram of a LIDAR sensor according to the present invention.

FIG. 9 shows an exemplary embodiment of a block diagram for an operation of the components of the afore-described LIDAR sensors 10, 20, 30, 40 which include a component assembly 1 according to the present invention. With the aid of a control unit 52, the determination of a start trigger by mirror position 53 as well as detector selection 51 with regard to detector system 50 having first to third detector 42a to 42c is able to take place at the same time. Via an offset 57, the laser driver is able to be activated, which operates laser sources 5 and loads a monitoring diode 54 via a beam splitter 58 and also guides beam 7 onto polygon mirror 44 in order to route it into the field of view. A reference beam of emitted beam 7 is recorded with the aid of a monitoring diode 54 and taken into consideration for time-of-flight measurement 55. In addition, the detected signal of detector system 50 is taken into account in time-of-flight measurement 55.

Figure 10:
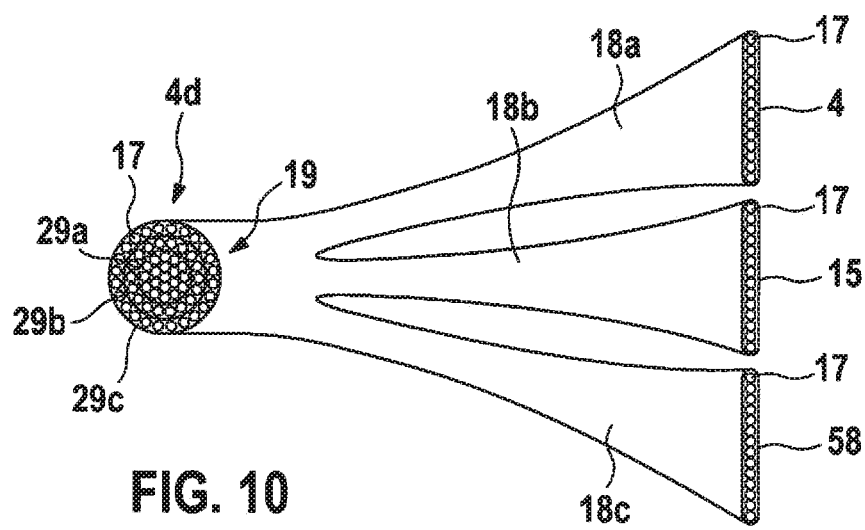
FIG. 10 shows an exemplary embodiment of an initial system of optical waveguides according to the present invention.

FIG. 10 shows an exemplary embodiment of an initial system 4d of optical waveguides 4, 15, 58 according to the present invention. The first to third optical waveguides 4, 15, 58 have inputs 18a, 18b, 18c which are spatially separated from one another, whereas optical waveguides 4, 15, 58 have a common output 19. Light-conducting fibers 17 at output 19 of the respective first to third optical waveguides are disposed in the form of concentric rings 29a to 29c.

Figure 11:
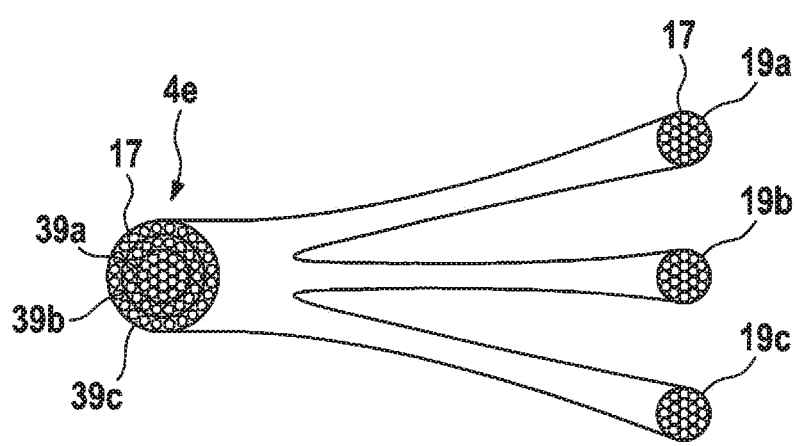
FIG. 11 shows an exemplary embodiment of a complementary system of complementary optical waveguides.

FIG. 11 shows an exemplary embodiment of a complementary system 4e of complementary light-conducting fibers 39a, 39b, 39c, which supplement initial system 4d from FIG. 10 in the light conduction. Complementary system 4e may be situated in the receiving path of a LIDAR system according to the present invention in addition to initial system 4d.

Figure 12:
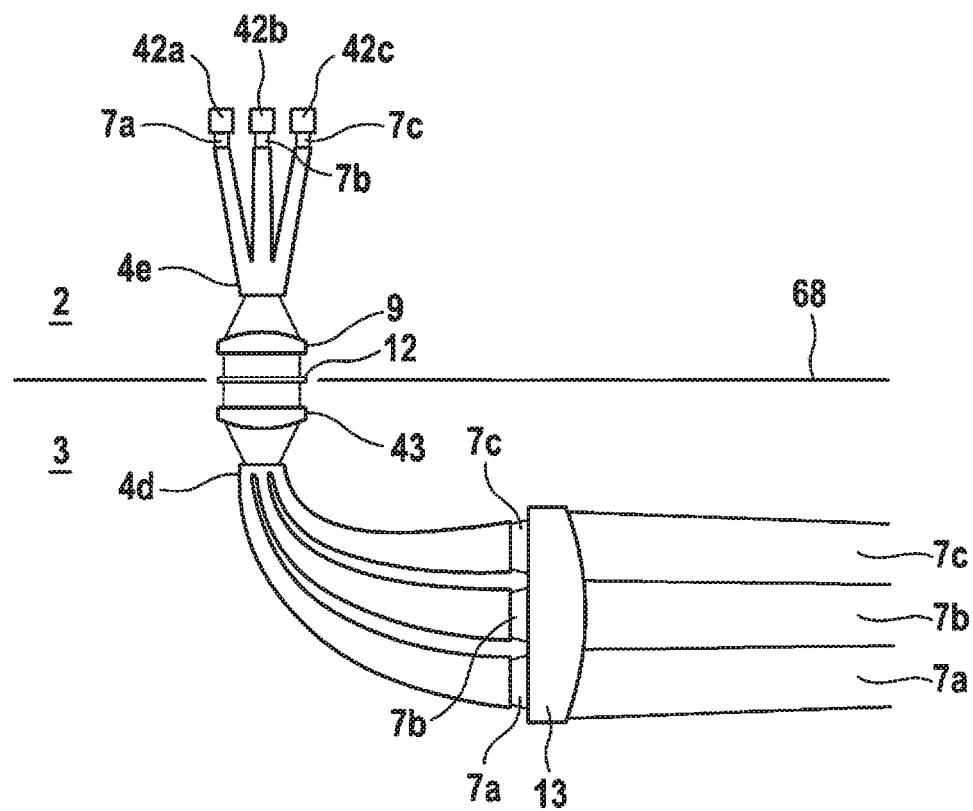
FIG. 12 shows an exemplary embodiment of a receiving path of a LIDAR system according to the present invention.

FIG. 12 shows an exemplary embodiment of a receiving path 69 of a LIDAR sensor 10, 20, 30, 40 according to the present invention. First to third light beams 7a, 7b, 7c are able to be received within rotor 3 and be detected within stator 2, which is separated from rotor 3 by separation line 68. Light beams 7a, 7b, 7c are received by initial system 4d and coupled into complementary system 4e described in FIG. 11 via a collimation optics 43, a filter 12 and a focusing optics. By way of complementary system 4e, first to third light beams 7a to 7c finally arrive at first to third detectors 42a to 42c.

EXAMPLES

In the following text, the image rate, for instance, for an exemplary measurement, is calculated. This calculation uses the following formula, where:
f: the image rate in Hz,
Nh: the number of shots in the horizontal FOV;
Nv: the number of shots in the vertical FOV; and
Δt: the uniqueness range for the maximum measuring duration (time of light)@180 m/c,
where
c: is the speed of light, with Δt=1.2 µs.
f=1/(Nh·Nv·Δt)

Given the requirement of a resolution of 0.15° in the horizontal and vertical directions at 360° and a field of view of 24° and a range of 180 m, the result is Nh=2400.
Nv=160→frequency f=2.17 Hz.
This image rate is not sufficient, which means that the range of the resolution must be reduced. An alternative is to shoot in parallel at an angular offset using five lasers so that a higher image rate of approximately 10 Hz is achieved with the corresponding resolution.
The frequency of the micro mirror in the vertical for an image frequency=10 Hz.
tv=tu/Nh
Here, tv is the time for a vertical movement of the mirror, to is the time for a rotation of the rotor, and Nh is the number of shots in the horizontal field of view.
At an image rate of 10 Hz→resolution 0.15°.
tv=0.1 s/2400→tv=41.6 µs→period duration of the mirror (back and forth)=2x tv=82.2 µs.
→frequency of the micro mirror=1/period duration=12 kHz
Frequency of the polygon mirror in the vertical for an image frequency of 10 Hz
tv=tu/Nh.

Requirement: image frequency 10 Hz→resolution 0.15° with 12 and 100 polygon elements.

tv=0.1/2400=41.6 μs→corresponds to movement time of a polygon tP=41.6 μs.

→polygon mirror having 12 facets: f=1/(NP·tP)=2 Kz=2000 r/sec=120000 r/min.

→polygon mirror having 100 facets f=1/(NP·tP)=1 KHz=240 r/sec=1440 r/min.

Here, tP is the time for a polygon element, and NP is the number of polygon elements.

Five lasers are required in order to achieve a resolution of 0.15° at a range of 180 m with a 10 Hz image frequency. The polygon mirror should have 12 to 100 facets. In the case of 12 facets, the required rotational speed is 120,000 r/min and in the case of 100 facets, the required rotational speed is 14,400 r/min.

What is claimed is:

1. A component assembly for a LIDAR sensor, comprising:
   a stator;
   a rotor;
   a detector system including a first detector; and
   a first optical waveguide having an input, an output, and light-conducting fibers;
   wherein:
      the first optical waveguide is situated within the rotor and is rotatable along with the rotor;
      the first optical waveguide is configured to receive a first light beam coming from a surrounding area via the input at the light-conducting fibers and to conduct it via the light-conducting fibers to the output in a direction of the first detector;
   wherein the component assembly includes at least one of the following four features (a)-(d):
      (a) at the input, the light-conducting fibers are arranged in a line, and, at the output, the light-conducting fibers are arranged as a bundle in which at least one of the light-conducting fibers are surrounded circumferentially by others of the light-conducting fibers;
      (b) (i) the component assembly further comprises collimation optics, a filter, and focusing optics, (ii) in a direction from the output of the first optical waveguide to the first detector, the collimation optics is arranged downstream from the output of the first optical waveguide, the filter is arranged downstream from the collimation optics, and the focusing optics is arranged downstream from the filter and upstream from the first detector, (iii) the collimation optics is configured to expand the first light beam from the output of the first optical waveguide into a collimated beam, (iv) the filter is configured to filter the collimated beam from the collimation optics, and (v) the focusing optics is configured to contract the filtered collimated beam from the filter to focus the filtered collimated beam towards the first detector;
      (c) the input of the first optical waveguide has a rectangular form with an edge length of 2 mm to 25 mm; and
      (d) (i) the detector system further includes a second detector that is spatially separated from the first detector, (ii) the first optical waveguide is one of a first plurality of waveguides of a first waveguide system that each has a respective input, (iii) the inputs of the first plurality of waveguides are spatially separated from one another, (iv) the output of the first optical waveguide is a common output of the first plurality of waveguides, (v) the component assembly further comprises a second waveguide system that includes a plurality of optical waveguides, (vi) the plurality of optical waveguides of the second waveguide system have spatially separate outputs and a common input, and (vii) the second waveguide system is configured to guide a light beam emerging from the first waveguide system to the first and second detectors.

2. The component assembly as recited in claim 1, wherein a second optical waveguide of the component assembly is configured to guide a second light beam, received from the surrounding area, onto a different detector than the first detector and that is spatially separated from the first detector, and the second optical waveguide is situated within the rotor and is disposed so as to be able to rotate along with the rotor.

3. A component assembly for a LIDAR system, the component assembly comprising:
   a stator;
   a rotor;
   a detector system including a first detector;
   a first optical waveguide having an input, an output, and light-conducting fibers; and
   a second optical waveguide that has an input, an output, and light-conducting fibers;
   wherein:
      the input of the first optical waveguide and the input of the second optical waveguide form a common continuous input; and
      the outputs of the first optical waveguide and the second optical waveguide are spatially separated from one another.

4. The component assembly as recited in claim 1, wherein a diameter of the light-conducting fibers of the first optical waveguide amounts to 10 μm to 150 μm.

5. The component assembly as recited in claim 1, further comprising:
   a laser source situated on the stator and/or in the rotor.

6. The component assembly as recited in claim 1, wherein the rotor has a transmitter unit provided with a micro mirror.

7. The component assembly as recited in claim 1, wherein the input of the first optical waveguide has the rectangular form with the edge length of 2 mm to 25 mm.

8. The component assembly as recited in claim 1, wherein the first optical waveguide is configured to deflect the first light beam at least once.

9. The component assembly as recited in claim 1, wherein the first detector is positioned outside the rotor.

10. The component assembly as recited in claim 1, wherein the component assembly further comprises the filter, the filter being situated between the first detector and the output of the first optical waveguide.

11. A LIDAR system including a component assembly, the component assembly comprising:
   a stator;
   a rotor;
   a detector system including a first detector; and
   a first optical waveguide having an input, an output, and light-conducting fibers;
   wherein:
      the first optical waveguide is situated within the rotor and is rotatable along with the rotor;
      the first optical waveguide is configured to receive a first light beam coming from a surrounding area via the input at the light-conducting fibers and to conduct it via the light-conducting fibers to the output in a direction of the first detector;
wherein the component assembly includes at least one of the following four features (a)-(d):
(a) at the input, the light-conducting fibers are arranged in a line, and, at the output, the light-conducting fibers are arranged as a bundle in which at least one of the light-conducting fibers is surrounded circumferentially by others of the light-conducting fibers;
(b) (i) the component assembly further comprises collimation optics, a filter, and focusing optics, (ii) in a direction from the output of the first optical waveguide to the first detector, the collimation optics is arranged downstream from the output of the first optical waveguide, the filter is arranged downstream from the collimation optics, and the focusing optics is arranged downstream from the filter and upstream from the first detector, (iii) the collimation optics is configured to expand the first light beam from the output of the first optical waveguide into a collimated beam, (iv) the filter is configured to filter the collimated beam from the collimation optics, and (v) the focusing optics is configured to contract the filtered collimated beam from the filter to focus the filtered collimated beam towards the first detector;
(c) the input of the first optical waveguide has a rectangular form with an edge length of 2 mm to 25 mm; and
(d) (i) the detector system further includes a second detector that is spatially separated from the first detector, (ii) the first optical waveguide is one of a first plurality of waveguides of a first waveguide system that each has a respective input, (iii) the inputs of the first plurality of waveguides are spatially separated from one another, (iv) the output of the first optical waveguide is a common output of the first plurality of waveguides, (v) the component assembly further comprises a second waveguide system that includes a second plurality of optical waveguides, (vi) the second plurality of optical waveguides of the second waveguide system have spatially separate outputs and a common input, and (vii) the second waveguide system is configured to guide a light beam emerging from the first waveguide system to the first and second detectors.

12. The component assembly as recited in claim 3, wherein the second optical waveguide is configured to guide a second light beam received from the surrounding area onto a second detector that is spatially separated from the first detector, and the second optical waveguide is situated within the rotor and is disposed so as to be able to rotate along with the rotor.

13. The component assembly as recited in claim 1, wherein, at the input, the light-conducting fibers are arranged in the line, and, at the output, the light-conducting fibers are arranged as the bundle in which the at least one of the light-conducting fibers is surrounded circumferentially by the others of the light-conducting fibers.

14. The component assembly as recited in claim 1, wherein:
the component assembly further comprises the collimation optics, the filter, and the focusing optics;
in the direction from the output of the first optical waveguide to the first detector, the collimation optics is arranged downstream from the output of the first optical waveguide, the filter is arranged downstream from the collimation optics, and the focusing optics is arranged downstream from the filter and upstream from the first detector;
the collimation optics is configured to expand the first light beam from the output of the first optical waveguide into the collimated beam;
the filter is configured to filter the collimated beam from the collimation optics; and
the focusing optics is configured to contract the filtered collimated beam from the filter to focus the filtered collimated beam towards the first detector.

15. The component assembly as recited in claim 1, wherein a number of the light-conducting fibers of the first optical waveguide amounts to 500 to 1,000.

16. The component assembly as recited in claim 1, further comprising a polygon mirror by which a light beam, which is emitted out from the component assembly, is reflected.

17. The component assembly as recited in claim 16, wherein the polygon mirror is configured to rotate about an axis that is perpendicular to a direction in which the light beam which is emitted out from the component assembly is directed towards the polygon mirror.

18. The component assembly as recited in claim 17, wherein the axis is perpendicular to an axis of rotation of the rotor.

19. The component assembly as recited in claim 1, wherein:
the detector system further includes the second detector that is spatially separated from the first detector;
the first optical waveguide is one of the first plurality of waveguides of the first waveguide system that each has a respective input;
the inputs of the first plurality of waveguides are spatially separated from one another;
the output of the first optical waveguide is a common output of the first plurality of waveguides;
the component assembly further comprises a second waveguide system that includes a second plurality of optical waveguides;
the second plurality of optical waveguides of the second waveguide system have spatially separate outputs and a common input; and
the second waveguide system is configured to guide a light beam emerging from the first waveguide system to the first and second detectors.

* * * * *